(12) United States Patent
Banke et al.

(10) Patent No.: US 8,738,364 B2
(45) Date of Patent: May 27, 2014

(54) ADAPTATION OF VOCABULARY LEVELS FOR ENHANCED COLLABORATION

(75) Inventors: Christine A. Banke, Skaneateles, NY (US); William S. Carter, Round Rock, TX (US); Pawan Khera, Sewickley, PA (US); James R. Kraemer, Santa Fe, NM (US); Elizabeth V. Woodward, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 215 days.

(21) Appl. No.: 13/325,202

(22) Filed: Dec. 14, 2011

(65) Prior Publication Data

US 2013/0158978 A1    Jun. 20, 2013

(51) Int. Cl.
*G06F 17/27*  (2006.01)
*G10L 21/00*  (2013.01)
*G10L 25/00*  (2013.01)

(52) U.S. Cl.
USPC ............. 704/9; 704/270; 704/270.1; 704/275

(58) Field of Classification Search
USPC .............................................. 704/9, 270–275
See application file for complete search history.

(56) References Cited

U.S. PATENT DOCUMENTS

| | | | | |
|---|---|---|---|---|
| 4,305,131 | A | * | 12/1981 | Best .............................. 715/716 |
| 5,541,836 | A | | 7/1996 | Church et al. |
| 5,864,844 | A | * | 1/1999 | James et al. .................. 715/762 |
| 5,930,757 | A | * | 7/1999 | Freeman ...................... 704/272 |
| 6,226,533 | B1 | * | 5/2001 | Akahane ...................... 455/566 |
| 6,314,396 | B1 | * | 11/2001 | Monkowski .................. 704/233 |
| 6,944,592 | B1 | * | 9/2005 | Pickering ..................... 704/251 |
| 6,996,366 | B2 | * | 2/2006 | L'Allier et al. ............... 434/362 |
| 7,260,355 | B2 | * | 8/2007 | L'Allier et al. ............... 434/362 |
| 7,336,565 | B2 | * | 2/2008 | Rohrbacker et al. ........... 368/63 |
| 7,640,233 | B2 | | 12/2009 | Baartman et al. |
| 7,684,977 | B2 | * | 3/2010 | Morikawa ..................... 704/211 |
| 7,840,509 | B1 | | 11/2010 | Messina |
| 8,073,699 | B2 | * | 12/2011 | Michelini et al. .......... 704/270.1 |
| 8,126,713 | B2 | * | 2/2012 | Huang et al. .................. 704/254 |
| 2001/0029455 | A1 | * | 10/2001 | Chin et al. .................... 704/277 |
| 2003/0088543 | A1 | | 5/2003 | Skeen et al. |
| 2005/0034071 | A1 | * | 2/2005 | Musgrove et al. ............ 715/530 |
| 2006/0064637 | A1 | * | 3/2006 | Rechterman et al. ......... 715/530 |
| 2006/0287850 | A1 | * | 12/2006 | Morikawa ..................... 704/200 |
| 2007/0094183 | A1 | * | 4/2007 | Paek et al. ...................... 706/45 |

(Continued)

OTHER PUBLICATIONS

U.S. Appl. No. 13/325,183, Jan. 12, 2012, 1 page.

(Continued)

*Primary Examiner* — Eric Yen
(74) *Attorney, Agent, or Firm* — Francis Lammes; Stephen J. Walder, Jr.; Libby Z. Toub

(57) ABSTRACT

A mechanism is provided for adapting vocabulary levels in a collaborative session. A vocabulary level indicator is received for a first user in the collaborative session. During generation of an electronic communication by a second user in the collaborative session, text entered in the electronic communication is scanned in order to identify a vocabulary level associated with text. The vocabulary level associated with the text is compared to the vocabulary level indicator for the first user. Responsive to the text exceeding the vocabulary level indicator for the first user thereby indicating violating text, an indication is provided to the second user that the violating text is above a vocabulary level of the first user.

20 Claims, 5 Drawing Sheets

(56) References Cited

U.S. PATENT DOCUMENTS

| | | | |
|---|---|---|---|
| 2007/0150465 A1* | 6/2007 | Brave et al. | 707/5 |
| 2007/0156392 A1* | 7/2007 | Balchandran et al. | 704/9 |
| 2007/0174045 A1 | 7/2007 | Kao et al. | |
| 2008/0010356 A1 | 1/2008 | Rechterman et al. | |
| 2008/0059152 A1 | 3/2008 | Fridman et al. | |
| 2008/0109207 A1* | 5/2008 | Wood | 704/2 |
| 2010/0010802 A1* | 1/2010 | Ruano et al. | 704/9 |
| 2010/0088331 A1 | 4/2010 | White et al. | |
| 2012/0130714 A1* | 5/2012 | Zeljkovic et al. | 704/235 |

OTHER PUBLICATIONS

"Internet Slang Dictionary & Translator", http://www.blogher.com/frame.php?url=http://www.noslang.com, printed Aug. 30, 2011, 1 page.

"Method for Efficient Human to Computer Communication Including Application to Text Messaging", www.ip.com, IP.com No. IPCOM000197313D, Jul. 1, 2010, 2 pages.

"Technique for Intelligent, Custom, Message Size Reduction", www.ip.com; IP.com number: IPCOM000190354D, Nov. 24, 2009, 2 pages.

"URL Shortener & Text Shortener", http://tiny.tw/, printed Aug. 30, 2011, 2 pages.

"What is DTXTR?", http://www.dtxtrapp.com, printed Aug. 30, 2011, 1 page.

"Why do some people think deaf people are illiterate?", http://answers.yahoo.com/question/index?qid=20081113232640AAmEuL2, printed Dec. 13, 2011, 3 pages.

Bailey, Stacy C. et al., "Predictors of Misunderstanding Pediatric Liquid Medication Instructions", Clinical Research and Methods, Fam Med 2009;41(10), pp. 715-721.

Doak, Cecilia C. et al., "Teaching Patients with Low Literacy Skills", 2nd Edition, J. B. Lippincott Company, Philadelphia, PA, 1996, 12 pages.

Elhadad, Noemie , "User-Sensitive Text Summarization: Application to the Medical Domain", Ph.D. Thesis, Columbia University, 2006, 2 pages, Abstract only.

Maeda, Akira et al., "Query Term Disambiguation for Web Cross-Language Information Retrieval using a Search Engine", International Workshop on Information Retrieval with Asia Languages—IRAL, http://www.google.com/url?sa=t&source=web&cd=4&sqi=2&ved=0CDkQFjAD&url=http%3A%2F%2Fciteseerx.ist.psu.edu%2Fviewdoc%2Fdownload%3Bjsessionid%3DE173AE277E45A692174043C88EE74744%3, 2000, pp. 25-32.

Pakhomov, Serguei et al., "Abbreviation and Acronym Disambiguation in Clinical Discourse", American Medical Informatics Association (AMIA) Annual Symposium Proceedings, 2005, pp. 589-593.

Stum, Gregg M. et al., "Automatic Abbreviation Generation", Proceedings of the Fourteenth Annual RESNA Conference, http://www.asel.udel.edu/nli/pubs/1991/StumDema91.txt, Washington, D.C., 1991, 6 pages.

U.S. Appl. No. 13/613,547, Dec. 11, 2012, 1 page.

* cited by examiner

ADAPTATION OF VOCABULARY LEVELS FOR ENHANCED COLLABORATION

BACKGROUND

The present application relates generally to an improved data processing apparatus and method and more specifically to mechanisms for an adaptation of vocabulary levels for enhanced collaboration.

Collaboration is a recursive process where two or more people or organizations communicate together to realize a shared objective. Much of today's collaboration is performed using collaborative software designed to help people involved in a common task achieve a given objective. The design intent of collaborative software is to transform the way documents and rich media is shared to enable more effective collaboration. Collaborative software helps facilitate action oriented groups by providing tools that aid communication, collaboration, and the process of problem solving. Additionally, collaborative software may support project management functions, such as task assignments, time-managing deadlines, and shared calendars. The artifacts, the tangible evidence of the problem solving process, and the final outcome of the collaborative effort, require documentation and may involve archiving project plans, deadlines and deliverables. Understanding the differences in human interactions is necessary to ensure that appropriate technologies are employed to meet interaction needs.

One issue with current collaborative systems is a difficulty of understanding a meaning behind entered text when unfamiliar vocabulary is used in the electronic communication. That is, during a collaborative session, the level of vocabulary of the various participants in the collaborative session regarding the subject at hand may vary widely. For example, if a collaborative session is occurring between a doctor and a patient, a term may be used by the doctor that is unfamiliar to the patient. If the doctor were aware of a vocabulary level of the patient prior to sending the electronic communication, then the doctor would be able to replace the unfamiliar term prior to sending the electronic communication. By not having an indication of the vocabulary level of the other users in the collaborative session, additional interactions are required, which may be prevented if a vocabulary level of the other users is initially known.

SUMMARY

In one illustrative embodiment, a method, in a data processing system, is provided for adapting vocabulary levels in a collaborative session. The illustrative embodiment receives a vocabulary level indicator for a first user in the collaborative session. During generation of an electronic communication by a second user in the collaborative session, the illustrative embodiment scans text entered in the electronic communication in order to identify a vocabulary level associated with text. The illustrative embodiment compares the vocabulary level associated with the text to the vocabulary level indicator for the first user. The illustrative embodiment indicates to the second user that the violating text is above a vocabulary level of the first user in response to the text exceeding the vocabulary level indicator for the first user thereby indicating violating text.

In other illustrative embodiments, a computer program product comprising a computer useable or readable medium having a computer readable program is provided. The computer readable program, when executed on a computing device, causes the computing device to perform various ones of, and combinations of the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

As discussed previously, one issue with current collaborative system is a difficulty of understanding a meaning behind entered text when unfamiliar vocabulary is used in the electronic communication. That is, during a collaborative session, a level of vocabulary of the various participants in the collaborative session regarding the subject at hand may vary widely. By not having an indication of the level of vocabulary of the other parties in the collaborative session, additional interactions may be required, which could be prevented if a vocabulary level of the other parties is initially known. Thus, the illustrative embodiments provide mechanisms for users in a collaborative session to indicate their level of vocabulary, for analysis of text and sentence structure used in the collaborative session, and for providing an indication to the user typing text if a term is used that exceeds the vocabulary level of another user in the collaborative session.

Figure 1:
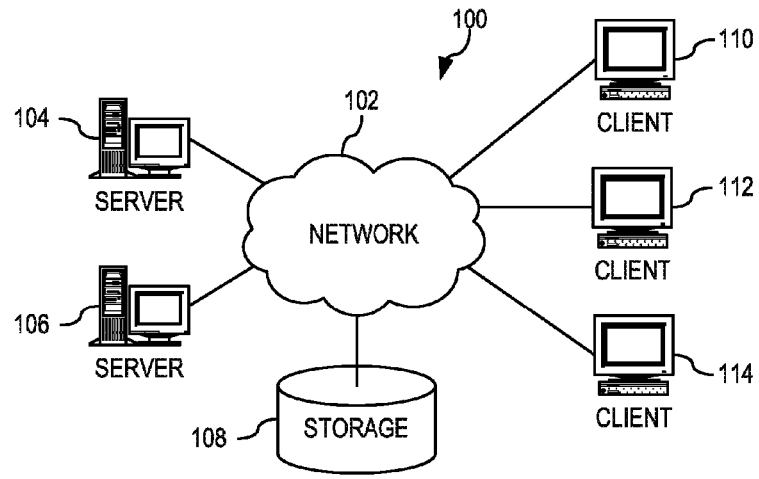
FIG. 1 depicts a pictorial representation of an example distributed data processing system in which aspects of the illustrative embodiments may be implemented.
Figure 2:
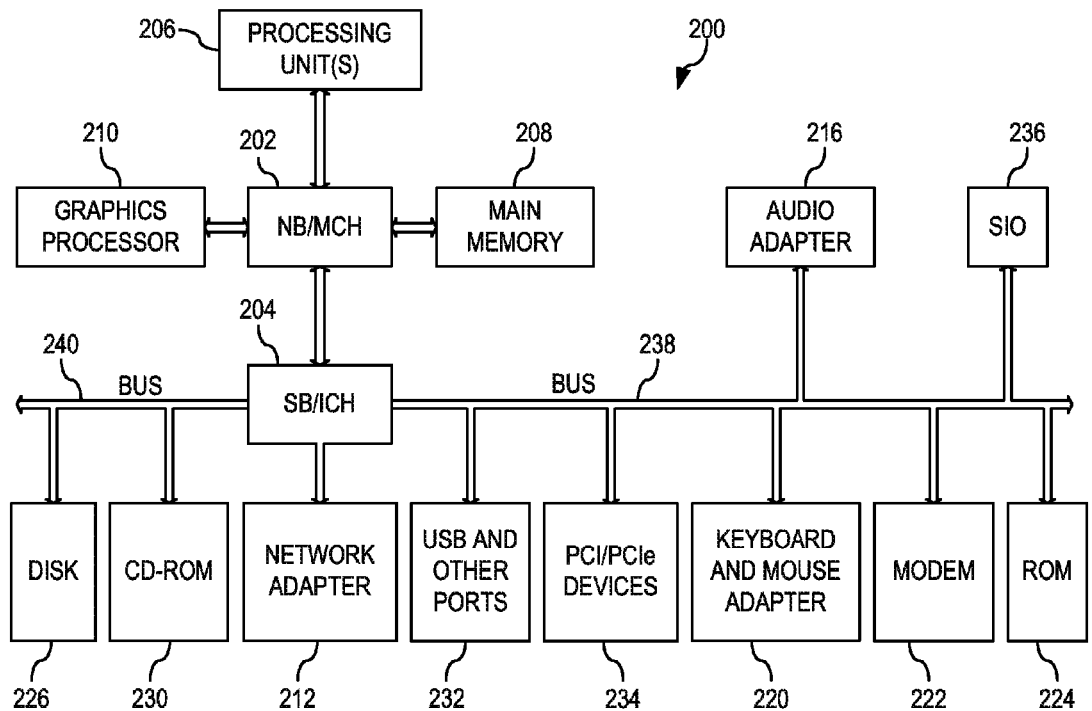
FIG. 2 is a block diagram of an example data processing system in which aspects of the illustrative embodiments may be implemented.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example data processing system in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System P® computer system, running the Advanced Interactive Executive (AIX®) operating system or the LIMA® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Again, in order to reduce additional electronic communications in a collaborative session, the illustrative embodiments provide mechanisms for users in a collaborative session to indicate their level of vocabulary, for analysis of text and sentence structure used in the collaborative session, and for providing an indication to the user typing text if a term is used to exceeds the vocabulary level of another user in the collaborative session.

Figure 3:
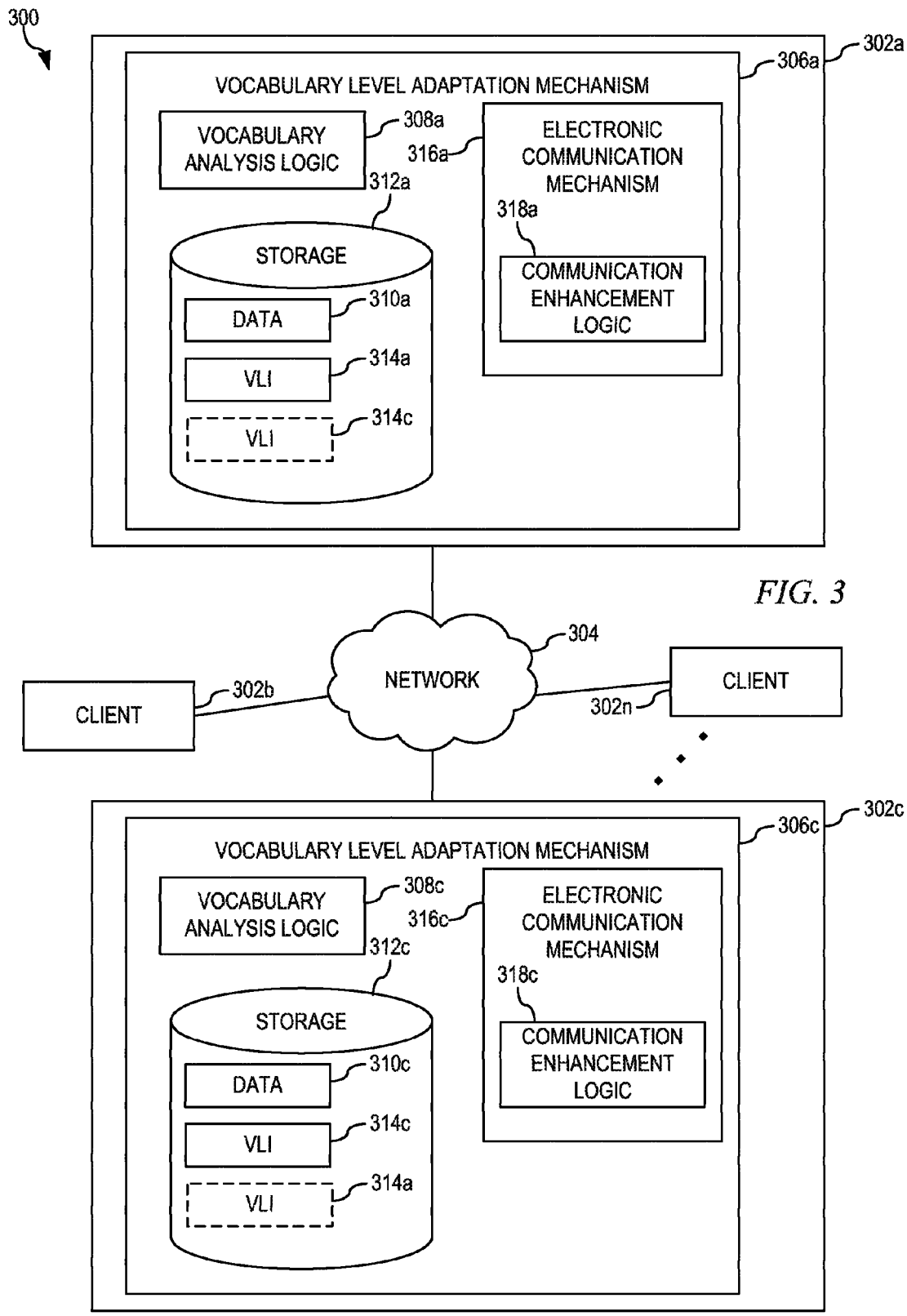
FIG. 3 depicts a functional block diagram of a vocabulary level adaptation mechanism for use in collaborative sessions in accordance with an illustrative embodiment.

FIG. 3 depicts a functional block diagram of a vocabulary level adaptation mechanism for use in collaborative sessions in accordance with an illustrative embodiment. Each of client devices 302a, 302b, 302c, . . . , 302n, which are coupled together via network 304 in distributed data processing system 300, comprise a vocabulary level adaptation mechanism. Vocabulary level adaptation mechanism 306a, for example, comprises vocabulary level analysis logic 308a that identifies a vocabulary level for the user. Vocabulary level analysis logic 308a may identify a vocabulary level for the user by receiving a direct indication of the vocabulary level from the user based on what the user believes or know their vocabulary level to be. However, if the user of client device 302a does not know their vocabulary level, then vocabulary level analysis logic 308a may identify a vocabulary level for the user by receiving excerpts of text the user has comfortably read, analyzing the excerpts, and identify a vocabulary level based on the analysis of the excerpts. If the user is not able to provide excerpts of text the user has comfortably read, then vocabulary level analysis logic 308a may analyze the user's electronic presence on the respective client device. That is, vocabulary level analysis logic 308a analyzes data 310a stored in storage 312a on the client device, such as, files, forum participation, blogs, social network activity, or the like, to determine a vocabulary level for the user. The analysis of the excerpts of text they have comfortable read or of the user's electronic presence may be performed using known grade level analysis logic, such as a SMOG readability tool, Nation and Laufer's level test, or the like. Once vocabulary level analysis logic 308a has identified a vocabulary level for the user, then vocabulary level analysis logic 308a stores vocabulary level indicator 314a in storage 312a.

Similarly, if the user of client device 302c does not know their vocabulary level, then vocabulary level analysis logic 308c may identify a vocabulary level for the user by receiving excerpts of text the user has comfortably read, analyzing the excerpts, and identify a vocabulary level based on the analysis of the excerpts. If the user is not able to provide excerpts of text the user has comfortably read, then vocabulary level analysis logic 308c may analyze the user's electronic presence on the respective client device. That is, vocabulary level analysis logic 308c analyzes data 310c stored in storage 312c on the client device, such as, files, forum participation, blogs, social network activity, or the like, to determine a vocabulary level for the user. Once vocabulary level analysis logic 308c has identified a vocabulary level for the user, then vocabulary level analysis logic 308c stores vocabulary level indicator 314c in storage 312c.

When the user of, for example client device 302a, communicates with another user of, for example client device 302c, using electronic communication mechanism 316a, electronic communication mechanism 316a in vocabulary level adaptation mechanism 306a initially sends vocabulary level indicator 314a to the electronic communication mechanism 316c in vocabulary level adaptation mechanism 306c. As the user of electronic communication mechanism 316c enters text into an electronic communication, communication enhancement logic 318c in electronic communication mechanism 316c scans the entered text targeted for the user of client device 302a in order to identify a vocabulary level associated with words or phrases. The text may be entered by typing text, using automatic speech recognition, or the like. The scan of the entered text may again be performed using known grade level analysis logic. In order to determine whether the identified words or phrases exceed vocabulary level indicator 314a associated with the user of client device 302a, communication enhancement logic 318c compares the vocabulary level associated with the words or phrases from the entered text to vocabulary level indicator 314a.

During the scan, if a word or phrase is identified that exceeds vocabulary level indicator 314a in storage 312c, then communication enhancement logic 318c provides an audible, visual, and/or tactile alert to the user that the word or phrase is above the vocabulary level of the user of client device 302a as well as an indication in the electronic communication to the user of electronic communication mechanism 316c that the word or phrase is above the vocabulary level of the user of client device 302a via an identifier, such as highlighting the text, bolding the text, italicizing the text, or some other way of identifying the word or phrase is above the vocabulary of the user of client device 302a. Once a word or phrase is identified to the user of electronic communication mechanism 316c, communication enhancement logic 318c may:

utilize an online thesaurus to recommend to the user a replacement word or phrase;
    recommend using shorter sentence structures; or
    depending on preset preferences for the user, automatically replace the word or phrase with a word or phrase that is appropriate to the vocabulary level of vocabulary level indicator 314a.

If communication enhancement logic 318c recommends a replacement word or phrase but the user of electronic communication mechanism 316c chooses not to make such a change, communication enhancement logic 318c may prompt the user to provide additional explanation. At this point, the user of electronic communication mechanism 316c may add additional text that provides the additional explanation, annotate the word or phrase with a hyperlink that provides additional information with regard to the word or phrase, provide some other indication to the user of client device 302a where additional information may be found that further defines the word or phrase, or choose to not to make a change whatsoever. Once the user of electronic communication mechanism 316c completes the electronic communication and all indicators have been addressed in the electronic communication, the user may then the electronic communication back to the user of client device 302a.

Similar to the above, at the beginning of the electronic communication, electronic communication mechanism 316c in vocabulary level adaptation mechanism 306c initially sends vocabulary level indicator 314c to the electronic communication mechanism 316a in vocabulary level adaptation mechanism 306a. Then similar to the above, as the user of electronic communication mechanism 316a enters text into an electronic communication, communication enhancement logic 318a in electronic communication mechanism 316a scans the entered text targeted for the user of client device 302c in order to identify a vocabulary level associated with words or phrases. During the scan, if a word or phrase is identified that exceeds vocabulary level indicator 314c, then communication enhancement logic 318a provides an indication to the user of electronic communication mechanism 3116a that the word or phrase is above the vocabulary level of the user of client device 302c. Once the user of electronic communication mechanism 316a completes the electronic communication and all indicators have been addressed in the electronic communication, the user may then transmit the electronic communication back to the user of client device 302c.

Thus, the illustrative embodiments provide mechanisms for users in a collaborative session to indicate their level of vocabulary for analysis of text and sentence structure used in the collaborative session. An indication is provided to the user typing text if a term is used that exceeds the vocabulary level of another user in the collaborative session. The user may then modify the entered text to provide text that meets the vocabulary level of the other user or provide additional information that will assist the other user in understanding the vocabulary used in the collaborative session.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Figure 4:
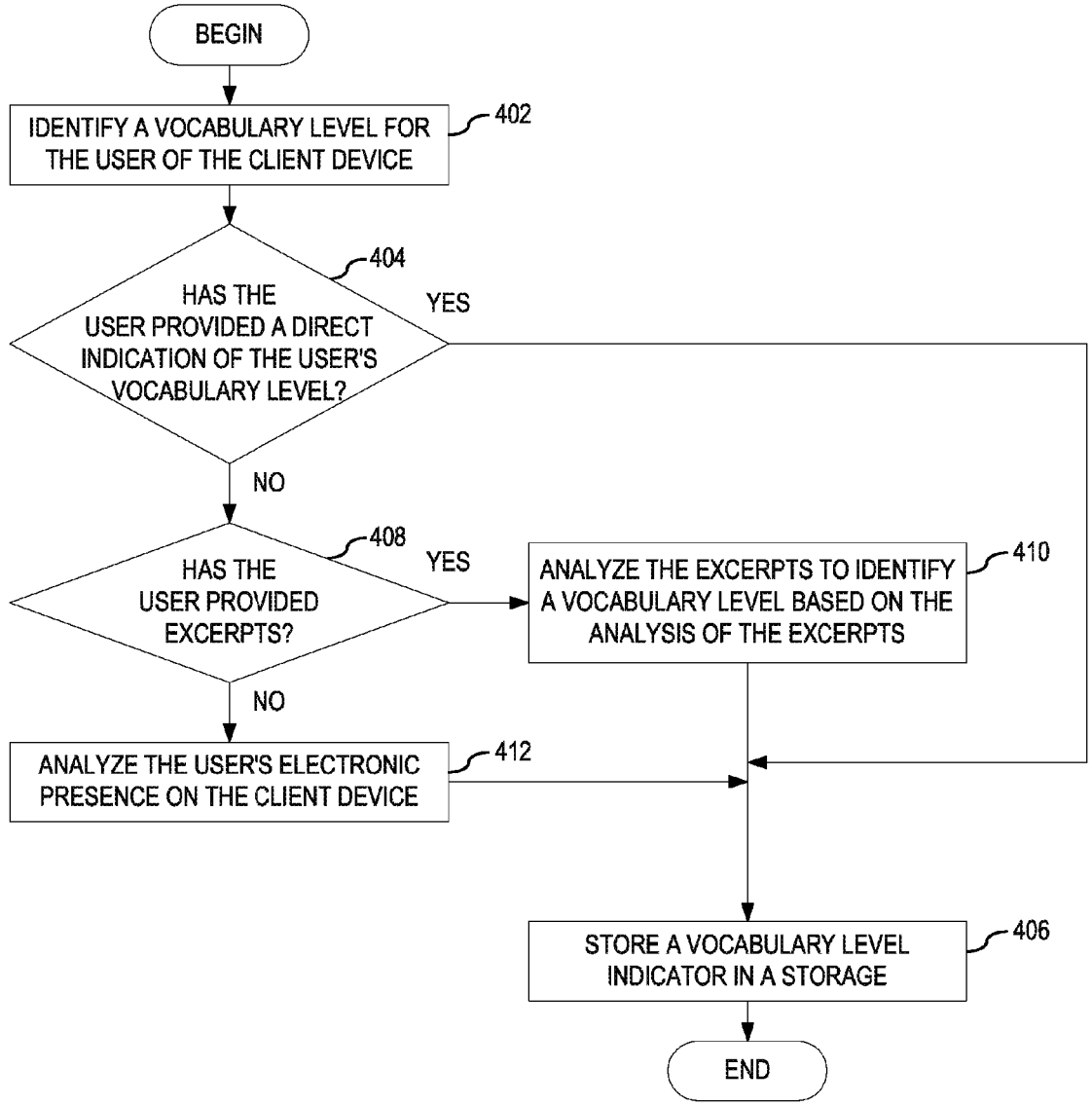
FIG. 4 depicts a flow diagram of the operation of generating a vocabulary level indicator for use in a collaborative session in accordance with an illustrative embodiment.

FIG. 4 depicts a flow diagram of the operation of generating a vocabulary level indicator for use in a collaborative session in accordance with an illustrative embodiment. As the operation begins, vocabulary level analysis logic in a vocabulary level adaptation mechanism identifies a vocabulary level for the user of the client device (step 402). In order to identify the vocabulary level of the user, the vocabulary level analysis logic prompts a user for a direct indication of the vocabulary level based on what the user believes or know their vocabulary level to be (step 404). If at step 404 the user provides the direct indication of the user's vocabulary level, then the vocabulary level analysis logic stores a vocabulary level indictor in a storage (step 406), with the operation ending thereafter.

If at step 404 the user fails to provide a direct indication of the user's vocabulary level, then the vocabulary level analysis logic may prompt the user to provide excerpts of text the user has comfortably read (step 408). If at step 408 the user provides the excerpts, then the vocabulary level analysis logic analyzes the excerpts to identify a vocabulary level based on the analysis of the excerpts (step 410), with the operation proceeding to step 406 thereafter. If at step 408 the user fails to provide excerpts of text the user has comfortably read, then the vocabulary level analysis logic analyzes the user's electronic presence on the client device (step 412). That is, the vocabulary level analysis logic analyzes data stored in storage of the client device, such as, files, forum participation, blogs, social network activity, or the like, to determine a vocabulary level for the user. Once the vocabulary level analysis logic has identified a vocabulary level for the user, then the operation proceeds to step 406.

Figure 5A:
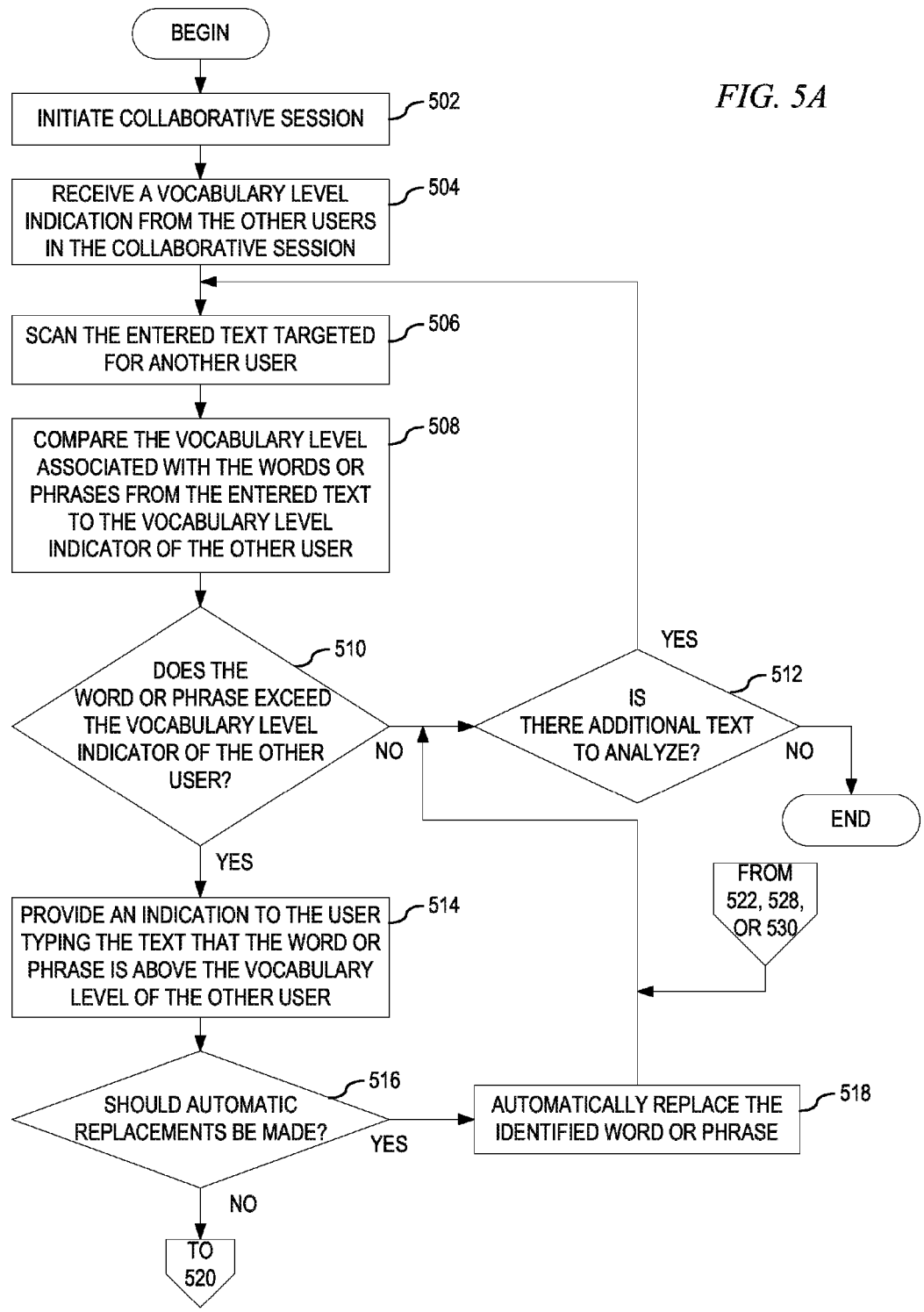
FIGS. 5A and 5B depict a flow diagram of the operation of adapting vocabulary levels of other users in a collaborative session in accordance with an illustrative embodiment.
Figure 5B:
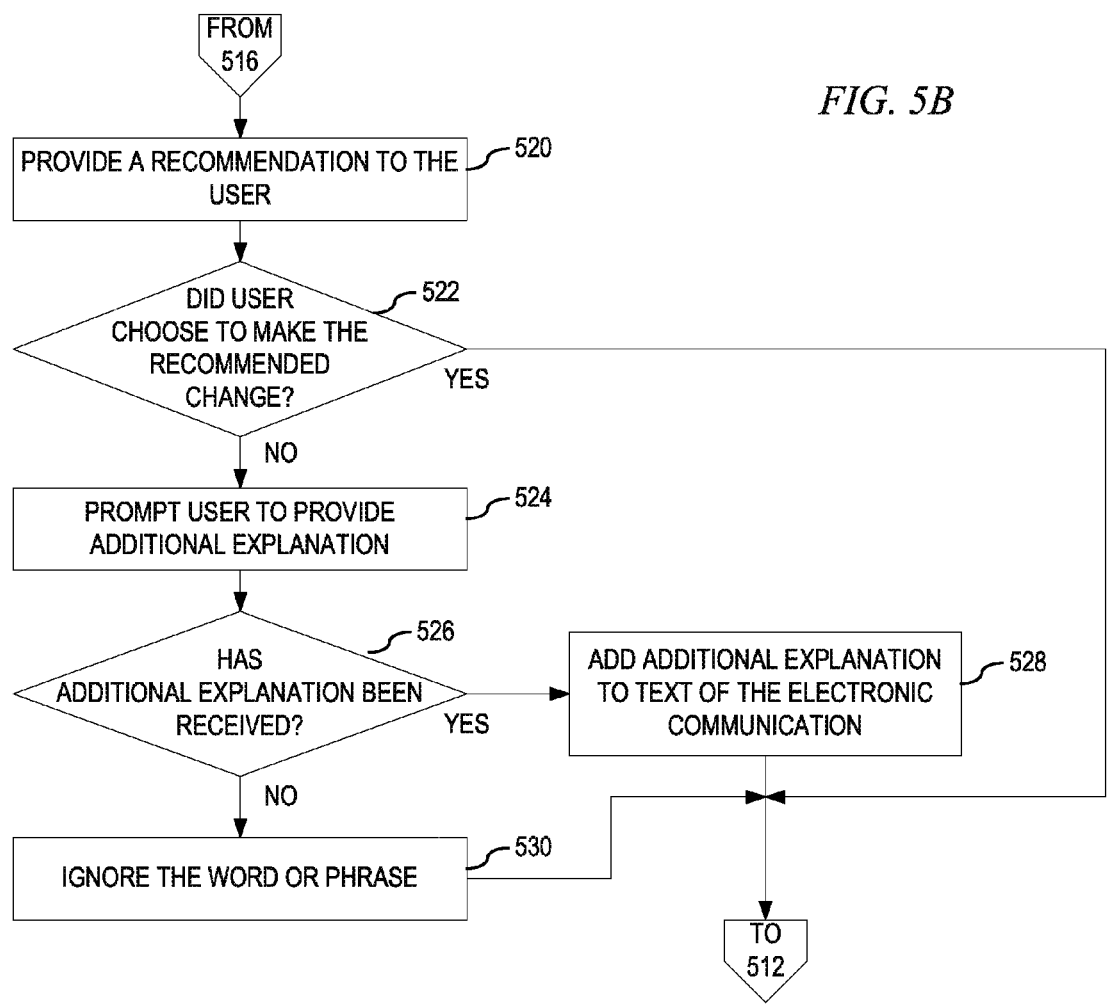

FIGS. 5A and 5B depict a flow diagram of the operation of adapting vocabulary levels of other users in a collaborative session in accordance with an illustrative embodiment. As the operation begins, collaborative session is initiated between a plurality of users using electronic communication mechanisms (step 502). Upon initiation of the collaborative session, each electronic communication mechanism associated with a user receives a vocabulary level indication from the other users in the collaborative session (step 504). As a user enters text into an electronic communication of the collaborative session, communication enhancement logic in the electronic communication mechanism scans the entered text targeted for another user in order to identify a vocabulary level associated with words or phrases in the entered text (step 506).

The communication enhancement logic compares the vocabulary level associated with the words or phrases from the entered text to the vocabulary level indicator of the other user (step 508). The communication enhancement logic then determines whether the identified word or phrase exceeds a vocabulary level indicator associated with the other user (step 510). If at step 510 the identified words or phrases fails to exceed the vocabulary level indicator associated with the other user, then the communication enhancement logic determines whether there is additional text to analyze (step 512). If at step 512 there is additional text to analyze, then the operation returns to step 506. If at step 512 there is no additional text to analyze, the operation terminates.

If at step 510 the identified words or phrases exceed the vocabulary level indicator associated with the other user, then the communication enhancement logic provides an indication to the user typing the text that the word or phrase is above the vocabulary level of the other user (step 514). Once a word or phrase is identified to the user typing the text, the communication enhancement logic determines whether user preferences indicate that automatic replacements methods should be used (step 516). If at step 516 user preferences indicate automatic replacements, then the communication enhancement logic automatically replaces the identified word or phrase with a word or phrase that is appropriate to the vocabulary level of the other user based on the vocabulary level indicator (step 518), with the operation proceeding to step 512 thereafter. However, if at step 516 user preferences indicate not to make automatic replacements, the communication enhancement logic provides a recommendation to the user (step 520). The recommendation may be a replacement of the word or phrase with a word or phrase from an online thesaurus to recommend to the user or a recommendation to use shorter sentence structures.

The communication enhancement logic then determines whether the user has chosen to make the recommended change (step 522). If at step 522 the user makes the recommended change, then the operation proceeds to step 512. If at step 522 the user declines the recommended change, the communication enhancement logic prompts the user to provide additional explanation (step 524). At this point, the user typing the text may add additional text that provides the additional explanation, annotate the word or phrase with a hyperlink that provides additional information with regard to the word or phrase, provide some other indication to the other user where additional information may be found that further defines the word or phrase, or choose to not to make a change whatsoever. The communication enhancement logic then determines whether additional explanation has been received or declined (step 526). If at step 526 the user chooses to provide additional explanation, then the additional explanation is added to the text of the electronic communication (step 528), with the operation proceeding to step 512 thereafter. If at step 526 the user chooses not to provide additional explanation, then the communication enhancement logic ignores the word or phrase (step 530), with the operation proceeding to step 512 thereafter.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart, illustration, can be implemented by special purpose hardware-based systems that perform the specified functions or acts, or combinations of special purpose hardware and computer instructions.

Thus, the illustrative embodiments provide mechanisms for adapting vocabulary levels in enhanced collaboration. In order to reduce additional electronic communications in a collaborative session, the illustrative embodiments provide mechanisms for users in a collaborative session to indicate their level of vocabulary, for analysis of text and sentence structure used in the collaborative session, and for providing an indication to the user typing text if a term is used to exceeds the vocabulary level of another user in the collaborative session.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for adapting vocabulary levels in a collaborative session, the method comprising:
   receiving, by a processor in the data processing system a vocabulary level indicator for a first user in the collaborative session; and
   during generation of an electronic communication by a second user in the collaborative session:
      scanning, by the processor, text entered in the electronic communication in order to identify a vocabulary level associated with text;
      comparing, by the processor, the vocabulary level associated with the text to the vocabulary level indicator for the first user; and
      responsive to the text exceeding the vocabulary level indicator for the first user thereby indicating violating text, indicating, by the processor, to the second user that the violating text is above a vocabulary level of the first user.

2. The method of claim 1, further comprising:
   determining, by the processor, whether user preferences of the second user indicate that an automatic replacement of the violating text should be initiated; and
   responsive to the user preferences of the second user indicating that the automatic replacement of the violating text should be initiated, automatically replacing, by the processor, the violating text with appropriate text equivalent to the vocabulary level indicated by the vocabulary level indicator.

3. The method of claim 1, wherein the indication to the second user that the violating text is above the vocabulary level of the first user is at least one of an audible, a visual, or a tactile alert.

4. The method of claim 1, further comprising:
   determining, by the processor, whether user preferences of the second user indicate that an automatic replacement of the violating text should be initiated; and
   responsive to the user preferences of the second user indicating that the automatic replacement of the violating text should not be initiated, recommending, by the processor, to the second user an action to address the violating text.

5. The method of claim 4, wherein the action is at least one of replacement text for the violating text or using shorter sentence structures.

6. The method of claim 4, further comprising:
   responsive to the second user failing to accept the action to address the violating text, prompting, by the processor, the second user to provide additional explanation of the violating text; and
   responsive to receiving the additional explanation, adding, by the processor, the additional explanation to the electronic communication.

7. The method of claim 6, wherein the additional explanation is at least one of additional text that provides the additional explanation of the violating text or an annotation of the violating text with a hyperlink that provides the additional explanation.

8. The method of claim 1, wherein the vocabulary level indicator for a first user is generated by the method comprising:
   prompting, by the processor, the first user for a direct indication of the vocabulary level of the first user.

9. The method of claim 1, wherein the vocabulary level indicator for a first user is generated by the method comprising:
   analyzing, by the processor, excerpts of text the first user has comfortably read to identify the vocabulary level of the first user.

10. The method of claim 1, wherein the vocabulary level indicator for a first user is generated by the method comprising:
    analyzing, by the processor, the first user's electronic presence on a client device of the first user to identify the vocabulary level of the first user, wherein analyzing the first user's presence comprises analyzing data stored in storage of the client device and wherein the data comprises at least one of files, forum participation, blogs, or social network activity.

11. A computer program product comprising a computer readable storage device having a computer readable program stored therein, wherein the computer readable program, when executed on a computing device, causes the computing device to:
    receive a vocabulary level indicator for a first user in a collaborative session; and
    during generation of an electronic communication by a second user in the collaborative session:
       scan text entered in the electronic communication in order to identify a vocabulary level associated with text;
       compare the vocabulary level associated with the text to the vocabulary level indicator for the first user; and
       responsive to the text exceeding the vocabulary level indicator for the first user thereby indicating violating text, indicate to the second user that the violating text is above a vocabulary level of the first user.

12. The computer program product of claim 11, wherein the computer readable program further causes the computing device to:
    determine whether user preferences of the second user indicate that an automatic replacement of the violating text should be initiated; and
    responsive to the user preferences of the second user indicating that the automatic replacement of the violating text should be initiated, automatically replace the violating text with appropriate text equivalent to the vocabulary level indicated by the vocabulary level indicator.

13. The computer program product of claim 11, wherein the indication to the second user that the violating text is above the vocabulary level of the first user is at least one of an audible, a visual, or a tactile alert.

14. The computer program product of claim 11, wherein the computer readable program further causes the computing device to:
    determine whether user preferences of the second user indicate that an automatic replacement of the violating text should be initiated; and responsive to the user preferences of the second user indicating that the automatic replacement of the violating text should not be initiated, recommend to the second user an action to address the violating text.

15. The computer program product of claim 11, wherein the vocabulary level indicator for a first user is generated by the computer readable program further causing the computing device to perform at least one of:
prompt the first user for a direct indication of the vocabulary level of the first user;
analyze excerpts of text the first user has comfortably read to identify the vocabulary level of the first user; or
analyze the first user's electronic presence on a client device of the first user to identify the vocabulary level of the first user, wherein analyzing the first user's presence comprises analyzing data stored in storage of the client device and wherein the data comprises at least one of files, forum participation, blogs, or social network activity.

16. An apparatus, comprising:
a processor; and
a memory coupled to the processor, wherein the memory comprises instructions which, when executed by the processor, cause the processor to:
receive a vocabulary level indicator for a first user in a collaborative session; and
during generation of an electronic communication by a second user in the collaborative session:
scan text entered in the electronic communication in order to identify a vocabulary level associated with text;
compare the vocabulary level associated with the text to the vocabulary level indicator for the first user; and
responsive to the text exceeding the vocabulary level indicator for the first user thereby indicating violating text, indicate to the second user that the violating text is above a vocabulary level of the first user.

17. The apparatus of claim 16, wherein the instructions further cause the processor to:
determine whether user preferences of the second user indicate that an automatic replacement of the violating text should be initiated; and
responsive to the user preferences of the second user indicating that the automatic replacement of the violating text should be initiated, automatically replace the violating text with appropriate text equivalent to the vocabulary level indicated by the vocabulary level indicator.

18. The apparatus of claim 16, wherein the indication to the second user that the violating text is above the vocabulary level of the first user is at least one of an audible, a visual, or a tactile alert.

19. The apparatus of claim 16, wherein the instructions further cause the processor to:
determine whether user preferences of the second user indicate that an automatic replacement of the violating text should be initiated; and
responsive to the user preferences of the second user indicating that the automatic replacement of the violating text should not be initiated, recommend to the second user an action to address the violating text.

20. The apparatus of claim 16, wherein the vocabulary level indicator for a first user is generated by the instructions further causing the processor to perform at least one of:
prompt the first user for a direct indication of the vocabulary level of the first user;
analyze excerpts of text the first user has comfortably read to identify the vocabulary level of the first user; or
analyze the first user's electronic presence on a client device of the first user to identify the vocabulary level of the first user, wherein analyzing the first user's presence comprises analyzing data stored in storage of the client device and wherein the data comprises at least one of files, forum participation, blogs, or social network activity.

* * * * *